United States Patent [19]

Jung

[11] Patent Number: 5,359,583

[45] Date of Patent: Oct. 25, 1994

[54] METHOD FOR PREVENTING ERRONEOUS RECORDING IN COMPACT DISC PLAYER

[75] Inventor: Jung J. Jung, Seoul, Rep. of Korea

[73] Assignee: SamSung Electronics Co., Ltd., Suwon, Rep. of Korea

[21] Appl. No.: 832,916

[22] Filed: Feb. 10, 1992

[30] Foreign Application Priority Data

Feb. 13, 1991 [KR] Rep. of Korea .................. 91-2395

[51] Int. Cl.⁵ .............................................. G11B 7/00
[52] U.S. Cl. ......................................... 369/54; 369/47; 369/58; 369/84
[58] Field of Search ........................ 369/32, 47-50, 369/53-54, 58, 83-84, 124; 360/15, 31

[56] References Cited

U.S. PATENT DOCUMENTS

| | | | |
|---|---|---|---|
| 4,817,075 | 3/1989 | Kikuchi et al. | 360/15 X |
| 4,839,879 | 6/1989 | Sawada et al. | 369/54 |
| 5,021,893 | 6/1991 | Scheffler | 360/15 |
| 5,132,956 | 7/1992 | Ichikawa | 360/31 X |

*Primary Examiner*—W. R. Young
*Attorney, Agent, or Firm*—Robert E. Bushnell

[57] ABSTRACT

A method for preventing erroneous recording in a compact disc player is disclosed, to prevent erroneous recording and selecting erroneous data during reproduction, wherein the conventional compact disc player is improved in such a manner that a memory is provided so as to store the data temporarily and to delay the recording of the data as required, and errors are detected during the delayed period of time, thereby preventing such defective music from being recorded.

13 Claims, 3 Drawing Sheets

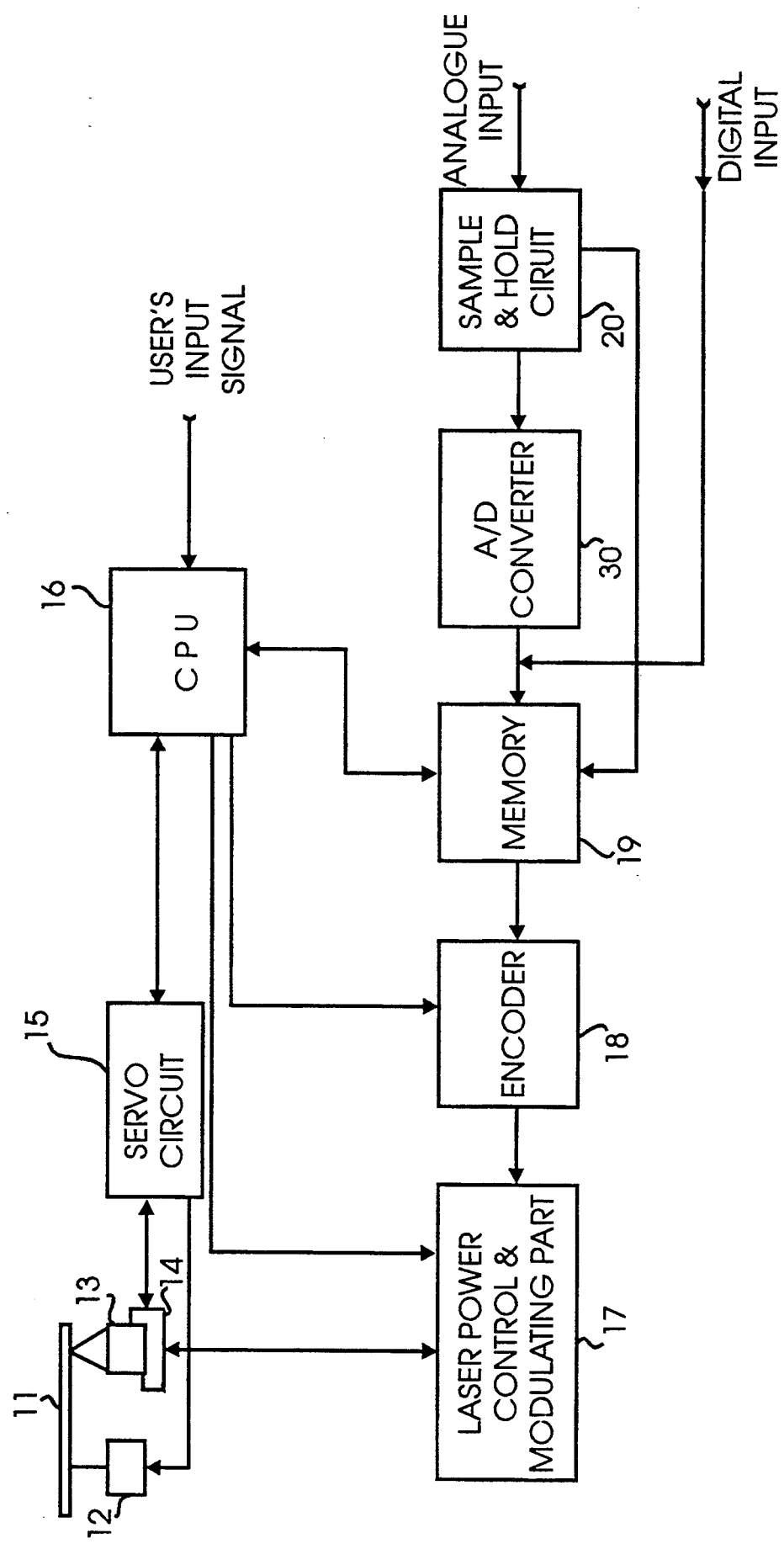

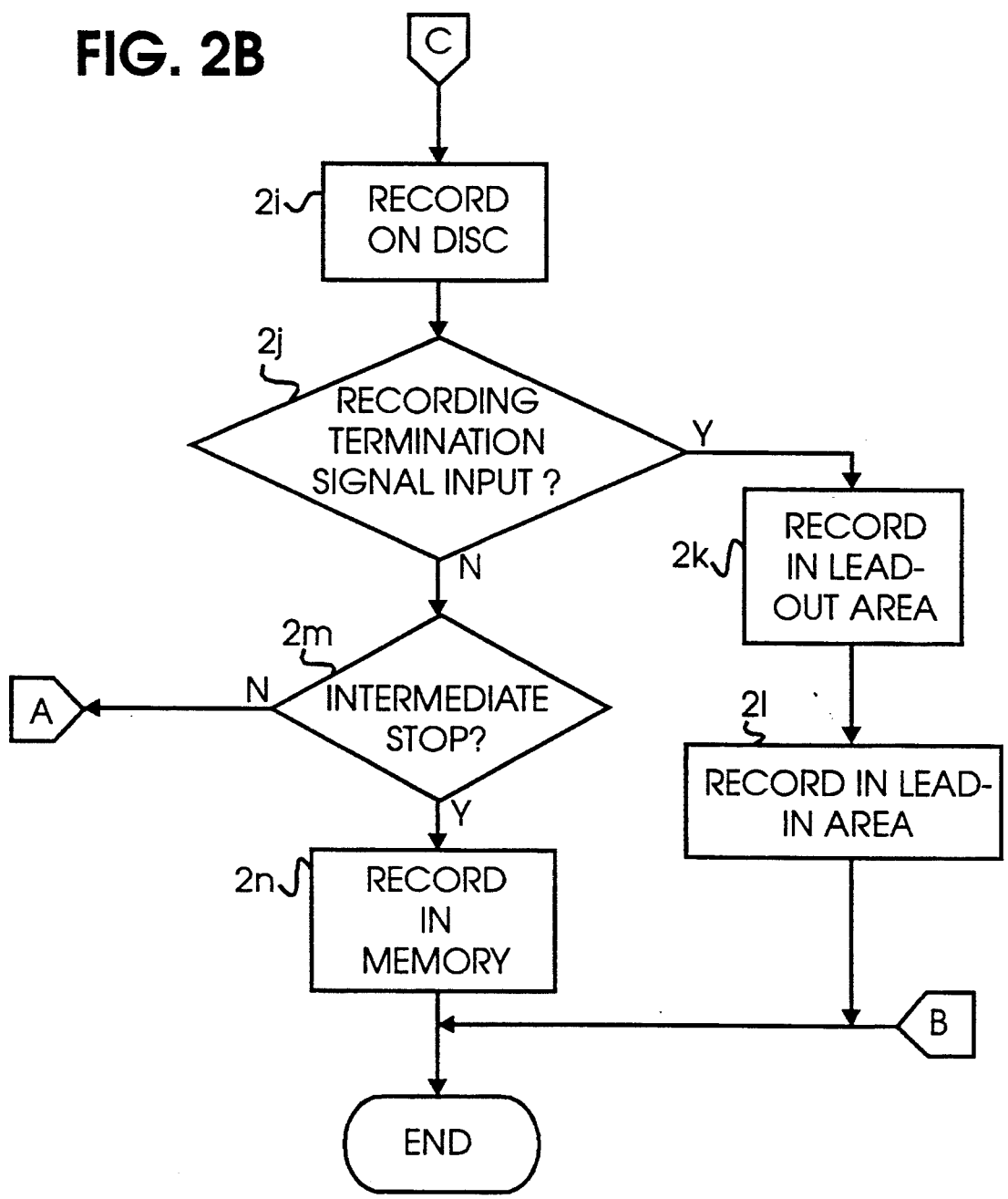

METHOD FOR PREVENTING ERRONEOUS RECORDING IN COMPACT DISC PLAYER

FIELD OF THE INVENTION

The present invention relates to a method for preventing an erroneous recording in a compact disc player in which the compact disc player can record audio data while preventing erroneous recording and preventing selection of defective music during a reproduction.

BACKGROUND OF THE INVENTION

Recently, the use of a recording and/or reproducing apparatus using lasers has become popular. In a popular recording and/or reproducing apparatus using semiconductor lasers and other lasers, an optical disc apparatus is usually adopted. The above recording and/or reproducing apparatus automatically records and/or reproduces audio data by forming pits on the face of the optional disc.

In such a conventional recording and/or reproducing apparatus, the recording is made by using a write once disc which can record only once. Therefore, during a data recording, if noises are input from the external, or if a recording mistake happens, the disc has to be discarded as a useless object, because the erroneously recorded data can not be erased.

SUMMARY OF THE INVENTION

The present invention is intended to overcome the above described disadvantages of the conventional techniques. Therefore, it is an object of the present invention to provide a method for preventing erroneous recording and preventing selection of defective music, during a reproduction, in a compact disc player capable of recording.

In order to attain the object, the method for preventing erroneous recording in a compact disc player according to the present invention is characterized by temporarily storing the data to be recorded in a memory having a predetermined capacity so as to delay the recording of the data for as long as is required to store the data in the memory, the halting the recording onto a disc upon finding an error during the delay period required to store the data, and removing the erroneous recording from the TOC (Table of Contents) music list as soon as the recording is completed.

In order to achieve the above object, the erroneous recording preventing method according to the present invention includes the steps of designating an address in a memory upon producing digital audio signals in order to store the signals in the memory and setting a defective music number to the stored data upon finding a defect flag set in the case of a partly recorded disc, judging the presence of a user's erroneous recording input signal, recording the information concerning the music data into the program memory area and setting a defect flag in the presence of the erroneous recording input signal after a predetermined period of time has elapsed, recording the audio data onto the compact disc in the case of the absence of the erroneous recording input signal and the being full memory and judging the presence of the user's recording termination demanding input signal, judging whether it is an intermediate stop in the absence of the recording termination demanding signal so as to return the operation to the of judging the presence of a user's erroneous recording input signal step upon not finding the intermediate stop and to record the information on the music data into a program memory area upon finding an intermediate stop, and recording into a lead-out area upon producing the recording termination demanding signal and recording into a lead-in area, except in the case a defect flag is set.

BRIEF DESCRIPTION OF THE DRAWINGS

The above object and other advantages of the present invention will become more apparent by describing in detail the preferred embodiment of the present invention with reference to the attached drawings, in which:

FIG. 1 is a block diagram showing hardware used in the present invention; and

FIGS. 2A and 2B are flow charts showing a control operation of the present invention.

DESCRIPTION OF THE PREFERRED EMBODIMENT

Figure 2A:
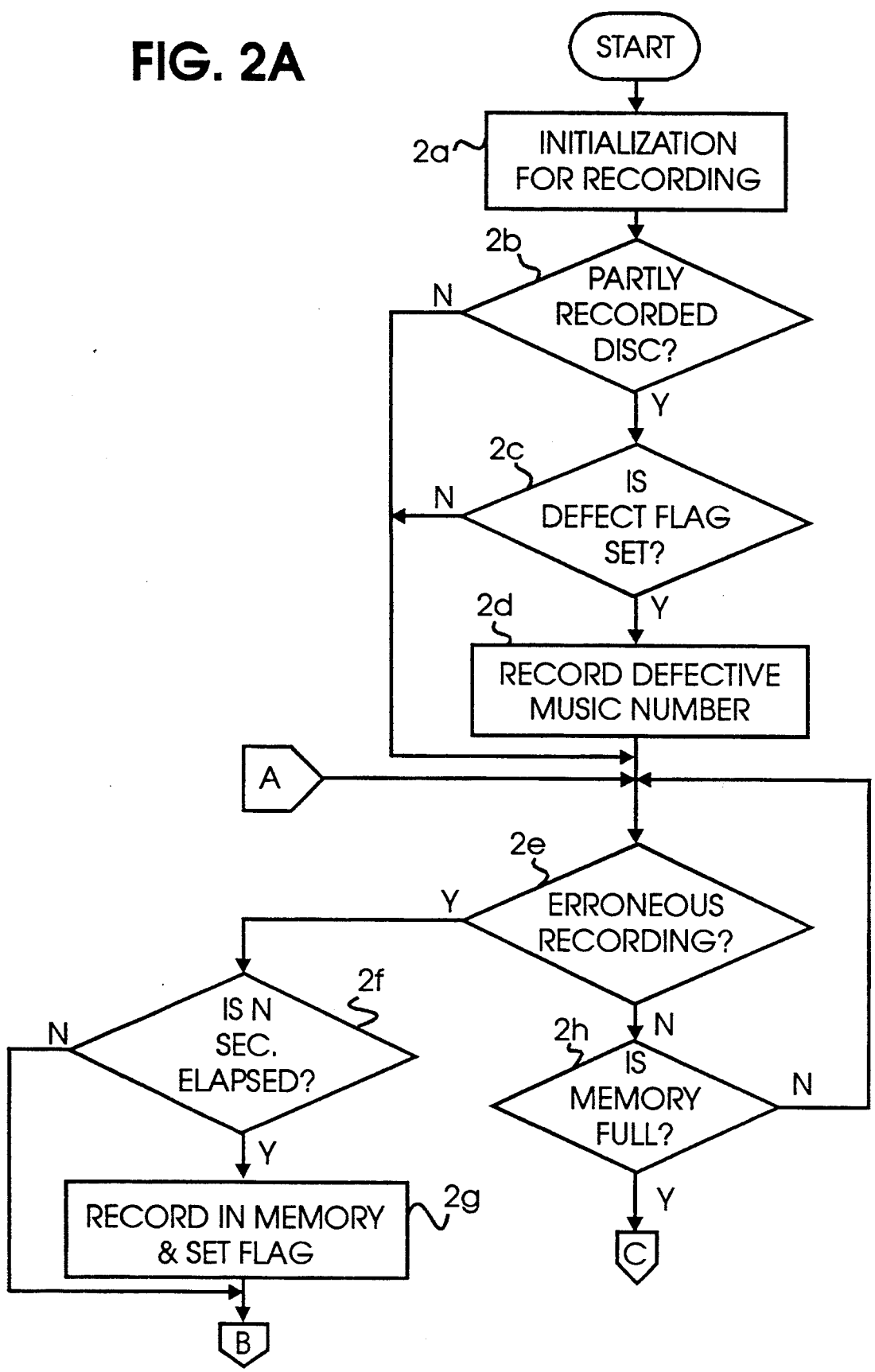

FIG. 1 is a block diagram showing hardware used in the present invention. As shown in FIG. 1, the hardware includes a compact disc 11 for recording data, a spindle motor 12 for rotating the compact disc 11 under a proper control, an optical pickup part 13 for writing to and reading from the compact disc 11 after receipt of laser modulated signals under a proper control, a sled motor 14 for horizontally moving the optical pickup part 13 under a proper control, a servo circuit 15 for feeding back focusing servo signals and tracking servo signals to the sled motor 14 after detecting them according to the pickup information of the optical pickup part 13 and for controlling the spindle motor 12 at a constant lines velocity (to be called CLV hereinafter) or below it, a central processing unit CPU 16 connected to the servo circuit 15 to control the overrnil system by carrying out processing based on the internal program; a sample and hold circuit 20 for carrying out sampling and holding an analogue input signal, an analogue-to-digital converter (hereinafter, to be termed A/D converter) 30 for converting analogue signals to digital signals, a memory 19 for storing digital signals in the form of eight-to-fourteen modulation (to be called "EFM") signals for a predetermined period of time under the control of the CPU 16 after receipt of the output from the A/D converter 30, an encoder 18 for encoding parity forming signals and EFM modulation signals according to the servo code signals of the CPU 16 after receipt of the output from the memory 19, and a laser power control and modulating part 17 for maintaining the laser power at a certain level after receipt of the output from the encoder 18 and for carrying out optical modulations on the EFM signals before providing them.

FIGS. 2A and 2B are flow charts showing a control operation of the present invention, wherein the method of the present invention comprises the step of designating an address in the memory upon producing digital audio signals in order to store the digital signals into the memory and setting a defective music number to the stored data upon finding a defect flag set in the case of a partly recorded disc, judging whether a user's erroneous recording input signal is input, recording the information concerning the music into the program memory area and setting a defect flag upon finding the erroneous recording input signal after a predetermined period of time has elapsed recording the audio data onto the compact disc upon not finding the erroneous recording input signal and upon finding the memory full, and then, judging whether the user's recording termination demanding signal is input, judging whether there is an intermediate stop upon not finding the recording termination demanding signal returning the operation to the step of judging whether a user's erroneous recording input signal is present upon not finding the intermediate stop and recording the music into the program memory area upon finding the intermediate stop, and recording into a lead-out area after receipt of a recording termination demanding signal and recording into a lead-in area, except the case that a defect flag is set.

The present invention as above will now be described in further detail.

The compact disc capable of recording is being widely used by the general public, and, in this situation, the present invention improves the impeding factors in such a manner that erroneously recorded music is skipped so as not to be recorded on the compact disc. The disc used in the present invention is compatible with the conventional write once disc, and classified into categories such as record completed disc, partly recorded disc, and blank disc.

Further, the disc is preformatted for the sake of recording convenience, and the disc includes information for CLV, information on recording power, and information on time.

Further, the disc is physically divided into a power control area, a program memory area, a lead-in area, and a lead-out area.

The power control area has different power levels for different disc manufacturers, and, even in the case of a recommended recording power, different situations can be brought out depending on different recording systems. Thus, the power control area only shows the information about the power recommended by the manufacturer, and therefore, recording has to be performed after adjusting the laser power to the optimum level through repeated recording tests into the area. The program memory area has the function as described below.

The lead-out area and the lead-in area are commonly recorded after the termination of the recording on the disc so as for the disc to have a compatibility with the conventional discs. In the case where the disc is recorded additionally, wherein the recording is stopped by the partial recording stop (intermediate stop), the lead-out area and the lead-in area are not recorded, and information for the tracks on which recordings are made so far is recorded into the program memory area. That is, the program memory area is for recording information on the recorded music, this recording being carried out each time an additional recording is made.

The constitution of the information recorded in the program memory area the same as that of a sub Q code which is area allocated on a sub coding frame format together with a sub P code.

The lead-in area has the same size as that of the conventional compact disc, and this area is for recording the information on the recorded tracks of the disc, i.e., TOC (Table Of Contents).

The lead-out area has the same size as that of the conventional compact disc, and is to record the information to inform of the end of the disc.

Thus, in the present invention, the data to be recorded is stored temporarily in a memory having a predetermined capacity, so that the actual disc recording time should be delayed correspondingly to the capacity of the memory. Thus, if an error is found during the delay time, the recording is stopped, and thus, the disc can not actually have an erroneous recording.

Further, even after the delay time has elapsed, if the recording is stopped, a defect flag is set when recording it into the program memory area, and the relevant recording is removed from the music list of the TOC upon completion of the recordings, so that it can not be selected during reproduction.

The signals provided into the CPU 16 of FIG. 1 are generated by the user and include signals such as recording starting signal, recording termination signal, and erroneous recording input signal. These signals are generated by the user by pressing keys in a key panel.

The A/D converter 30 and sample and hold circuit 20 are activated only when the analogue audio signals are provided from the external.

If the externally input signals are digital signals, they are directly stored in the memory 19, where the analogue inputs and the digital inputs are called music in the present invention.

If a recording start signal is input, the CPU 16 outputs an address signal, so that the externally input digital signals or the output from the A/D converter 30 is stored in the memory 19.

The memory 19 has a predetermined capacity, and, if a delay of N (N represents a positive real number) seconds is realized, A is set to be such that A cells=176.4 kilo bytes×8 according to the usual formula for calculating the memory capacity of a compact disc player. The value of 176.4 kilo bytes represents the data sampling frequency (per second) of a compact disc player, and 8 is used as the multiplier in order to convert bytes into bits.

When the memory is filled to capacity, the CPU 16 controls the encoder 18 to generate sub cede control signals, and the CPU 16 further controls the laser power control and modulating part 17 as well as the servo circuit 15.

The functions of the laser power control and modulating part 17, the encoder 18 and the servo circuit 15 are the same as those which are described above in connection with their constitutions, and therefore, the descriptions on their functions will be skipped, these being the general aspects of the components.

If an occurs error due to noise-contained music or the like, during the memory storing period, the user can input an erroneous recording input signal into the CPU 16 by pressing the appropriate key.

Now the operations of the circuit of the present invention will be described referring to the flow chart of FIG. 2.

First, the user installs a compact disc 11 to record into the spindle motor 12, and then, inputs a recording start signal. Then the CPU 16 carries out an initialization for a recording at a substep 2a of FIG. 2, and the CPU 16 judges at a substep 2b whether the currently installed disc is a partly recorded disc or not in order to recognize the state of the disc. If it is a partly recorded disc, it is checked at a substep 2c whether a defect flag is set in the program memory area.

If it is found that a defect flag is set on the music at the substep 2c, a music number is set in order to record a defective music number at a substep 2d. If it is found at the substep 2b that the disc is not a partly recorded disc, then it is judged that the disc is blank. If it is found that no defect flag is set on at the substep 2c, it is decided that the music is normal.

The substeps 2a, 2b, 2c and 2d are included in a first recording preparation step. Further, in this first step, the recorded music is converted to digital audio data and stored in the memory 19.

At a substep 2e in a second step, the CPU judges whether an erroneous recording input signal is provided by the user. At the second step, the user has to input an erroneous recording input signal within the time N after finding an error.

In the case where an erroneous recording input signal is provided at the substep 2e, when the predetermined period of time set at a substep 2f corresponding to the memory capacity has elapsed, the information on the music to be recorded into the program memory area is recorded at a substep 2g and a defect flag is set up before terminating the recording. The substeps 2f and 2g are included in a third step.

If no erroneous recording input signal is provided at the substep 2e, a judgment is made at a substep 2h whether the memory full. If the memory is not full, the operation is returned to the substep 2e, while if it is full, the contents of the memory are recorded in the program memory area of the disc 11 at a substep 2i. The amount of the recording performed at the substep 2i is equivalent to the capacity of the memory 19, and then a judgment is made at a substep 2j whether the user's recording termination demanding signal is provided. The substeps 2h, 2i, and 2j are included in a fourth step.

If no recording termination demanding signal is provided at the substep 2j, a judgment is made at a substep 2m whether it is an intermediate stop. If it is an intermediate stop, a writing is performed into the program memory area at a substep 2n before terminating the recording. The substeps 2m and 2n are included in a fifth step.

If a recording termination demanding signal is provided at the substep 2j, a recording is made into the lead-out area at a substep 2k, and a recording is made into the lead-in area at a substep 2l. A recording into the lead-in area is performed at the substep 2l, except in the case where a defect flag is set.

This is for excluding undesired music from selection during reproduction. The substeps 2k and 2l are included in a sixth step.

According to the compact disc player of the present invention, there is provided a memory capable of temporarily storing the data to be recorded, and the recording is delayed as much as is required to store the data into the memory, thereby detecting errors during the delay time. As a result, it becomes possible to prevent recording a undesired or defective music, so that they should not be selected during reproduction later.

The invention is in no way limited to the embodiment described hereinabove as various modifications of the disclosed embodiment as well as other embodiments of the invention will become apparent to persons skilled in the art upon reference to the description of the invention. It is, therefore, contemplated that the appended claims will cover any such modifications or embodiments as fall within the true scope of the invention.

What is claimed is:

1. A method for preventing erroneous recording of music data representing music onto a compact disk in a compact disk player having a panel of a plurality of user selectable keys, the method comprising the steps of:
   temporarily storing the music data, to be recorded onto said compact disk, in a memory having a predetermined capacity, to delay recording of the music data onto said compact disk for a period of time substantially the same as a time required to store the music data in said memory in response to user selection of a first one of said keys;
   determining whether an error input signal, indicating an erroneous recording, is input in response to user selection of a second one of said keys;
   determining whether said period of time has elapsed when said error input signal has been determined to have been input;
   halting the storage of the music data into said memory and preventing the recording of the music data onto the compact disc upon determining said error input signal has been input and said period of time has not elapsed; and
   storing information regarding the music data into a program memory area of said compact disk and setting a defect flat for removing information regarding an erroneous recording from a Table of Contents music list upon completion of said recording.

2. The method as set forth in claim 1, further comprising the steps of:
   determining whether said memory is full if it is determined that no error input signal has been input; and
   recording the music data stored in said memory onto said compact disk when said memory is determined to be full.

3. The method as set forth in claim 2, further comprising the steps of:
   determining whether a terminating input signal has been input by said user in response to selection of a third one of said keys during said recording step;
   determining whether said recording step has stopped intermediately when no terminating input signal has been input; and
   recording into said program memory area, information regarding tracks to which the music data was recorded during said recording step when it is determined that said recording step has stopped intermediately.

4. The method as set forth in claim 3, further comprising the steps of:
   recording end of disk information in a lead-out area of said compact disk when it has been determined that said termination input signal has been input; and then
   recording said Table of Contents information into a lead-in area of said compact disk.

5. The method as set forth in claim 1, said step of temporarily storing the music data further comprising the steps of:
   receiving, at a central processing unit, a recording start signal in response to said selection of said first one of said keys;
   providing address signals from said central processing unit to said memory for determining memory locations for storing said music data in response to said recording start signal; and
   determining whether said compact disk is blank and performing said step of determining whether an error input signal is input when said disk is determined to be blank.

6. The method as set forth in claim 5, said step of determining whether said compact disk is blank further comprises the steps of:
   determining whether said compact disk has been partially recorded on;

checking for a defect flag in said program memory area when said compact disk has been determined to have been partially recorded on;

performing said step of determining whether an error input signal is input when a defect flag has not been found in said program memory area.

7. An apparatus for preventing erroneous recording of audio data onto a compact disc in a compact disc recorder/player having a spindle motor for rotating said compact disc, optical means for writing to and reading the compact disc, a sled motor for horizontally moving said optical means, a servo circuit for controlling said spindle motor and for controlling said sled motor in response to information provided from said optical means, an encoder for providing parity information and eight-to-fourteen modulation signals to a laser power control and modulating means to control said optical means in order to record information onto the compact disc, and a central processing unit for controlling said encoder, said laser power control and modulating means and said servo circuit, said apparatus comprising:

a key panel having a plurality of user selectable keys, a first one of said keys for inputting a recording start signal to said central processing unit, a second one of said keys for inputting an erroneous recording signal to said central processing unit, and a third one of said keys for inputting a recording termination signal to said central processing unit;

said central processing unit for generating address signals and for determining a state of the compact disc indicating whether the compact disc is blank and whether the compact disk has been partially recorded on, in response to said recording start signal;

a memory for receiving said address signals and for temporarily storing the audio data, to be recorded onto the compact disc, at locations designated by said address signals to delay recording of the audio data onto the compact disc for a period of time substantially the same as a time required to store the audio data in said memory;

said central processing unit for halting the storage of said audio data into said memory and preventing said audio data from being recorded onto the compact disc in response to said erroneous recording signal when said central processing unit has determined the state of the compact disc to be blank or partially recorded; and said central processing unit controlling said encoder to output end of disc information to be recorded into a lead-out area of the compact disc only in response to reception of said recording termination signal.

8. The apparatus as claimed in claim 7, further comprising:

said central processing unit for determining whether said memory is full if said central processing unit has determined that no erroneous recording signal has been input, and for controlling the recording the audio data stored in said memory onto said compact disc when said memory is determined to be full.

9. An apparatus for preventing erroneous recording of audio data onto a compact disc in a compact disc recorder/player, said apparatus comprising:

a central processing unit;

a key panel having a plurality of user selectable keys, a first one of said keys for inputting a recording start signal to said central processing unit, a second one of said keys for inputting an erroneous recording signal to said central processing unit, and a third one of said keys for inputting a recording termination signal to said central processing unit;

said central processing unit generating address signals and determining whether a state of the compact disc is indicative of whether the compact disc is blank or has been partially recorded on in response to said recording start signal;

a memory for receiving said address signals and for temporarily storing the audio data, to be recorded onto the compact disc, at locations designated by said address signals to delay recording of the audio data onto the compact disc for a period of time substantially the same as a time required to store the audio data in said memory;

said central processing unit halting the storage of said audio data into said memory and preventing said audio data from being recorded onto the compact disc in response to said erroneous recording signal when said central processing unit has determined the state of the compact disc to be blank or partially recorded; and said central processing unit controlling an encoder to output end of disc information to be recorded into a lead-out area of the compact disc only in response to reception of said recording termination signal.

10. The apparatus as claimed in claim 9, further comprising:

said central processing unit detecting when said memory is full when no erroneous recording signal has been input for controlling the recording the audio data stored in said memory onto the compact disc.

11. The apparatus as claimed in claim 10, further comprising:

a spindle motor for rotating the compact disc;

optical means for writing to and reading the compact disc;

a sled motor for horizontally moving said optical means;

a servo circuit for controlling said spindle motor and for controlling said sled motor in response to information provided from said optical means; and an encoder for providing parity information and eight-to-fourteen modulation signals to a laser power control and modulating means to control said optical means in order to record information onto the compact disc.

12. An apparatus for preventing erroneous recording of audio data onto a compact disc in a compact disc recorder/player, said apparatus comprising:

a spindle motor for rotating the compact disc;

optical means for writing to and reading the compact disc;

a sled motor for horizontally moving said optical means;

a servo motor for controlling said spindle motor and for controlling said sled motor in response to information provided from said optical means;

an encoder for providing parity information and eight-to-fourteen modulation signals to a laser power control and modulating means to control said optical means in order to record information onto the compact disc;

a central processing unit for controlling said encoder, said laser power control and modulating means and said servo circuit;

a key panel having a plurality of user selectable keys, a first one of said keys for inputting a recording start signal to said central processing unit, a second one of said keys for inputting an erroneous recording signal to said central processing unit, and a third one of said keys for inputting a recording termination signal to said central processing unit;

said central processing unit for generating address signals and for determining a state of the compact disc indicating whether the compact disc is blank and whether the compact disk has been partially recorded on, in response to said recording start signal;

a memory for receiving said address signals and for temporarily storing the audio data, to be recorded onto the compact disc, at locations designated by said address signals to delay recording of the audio data onto the compact disc for a period of time substantially the same as a time required to store the audio data in said memory;

said central processing unit for halting the storage of said audio data into said memory and preventing said audio data from being recorded onto the compact disc in response to said erroneous recording signal when said central processing unit has determined the state of the compact disc to be blank or partially recorded; and said central processing unit controlling said encoder to output end of disc information to be recorded into a lead-out area of the compact disc only in response to reception of said recording termination signal.

13. The apparatus as claimed in claim 12, further comprising:

said central processing unit detecting when said memory is full when no erroneous recording signal has been input for controlling the recording the audio data stored in said memory onto the compact disc.

* * * * *

UNITED STATES PATENT AND TRADEMARK OFFICE
CERTIFICATE OF CORRECTION

PATENT NO. : 5,359,583
DATED : October 25, 1994
INVENTOR(S) : Jung-Joo Jung

It is certified that error appears in the above-indentified patent and that said Letters Patent is hereby corrected as shown below:

IN THE TITLE PAGE

Inventor, [75], Change "Jung J. Jung" to --Jung-Joo Jung--.

Signed and Sealed this

Twelfth Day of December, 1995

Attest:

BRUCE LEHMAN

*Attesting Officer*  *Commissioner of Patents and Trademarks*